May 17, 1927.
F. L. MORROW
1,629,355
AUTOMATIC POTATO CHIP MACHINE
Filed April 11, 1925
7 Sheets-Sheet 1
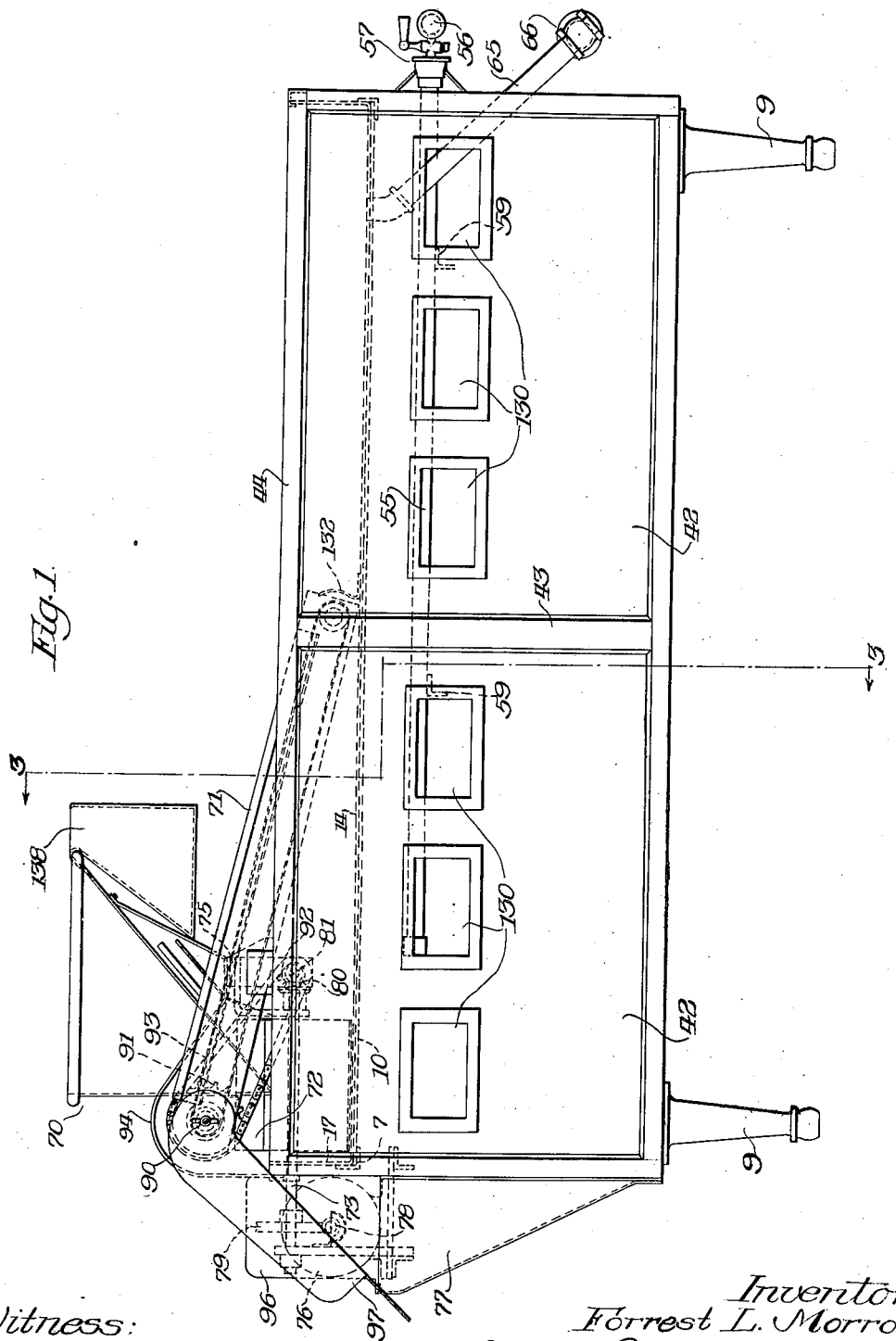

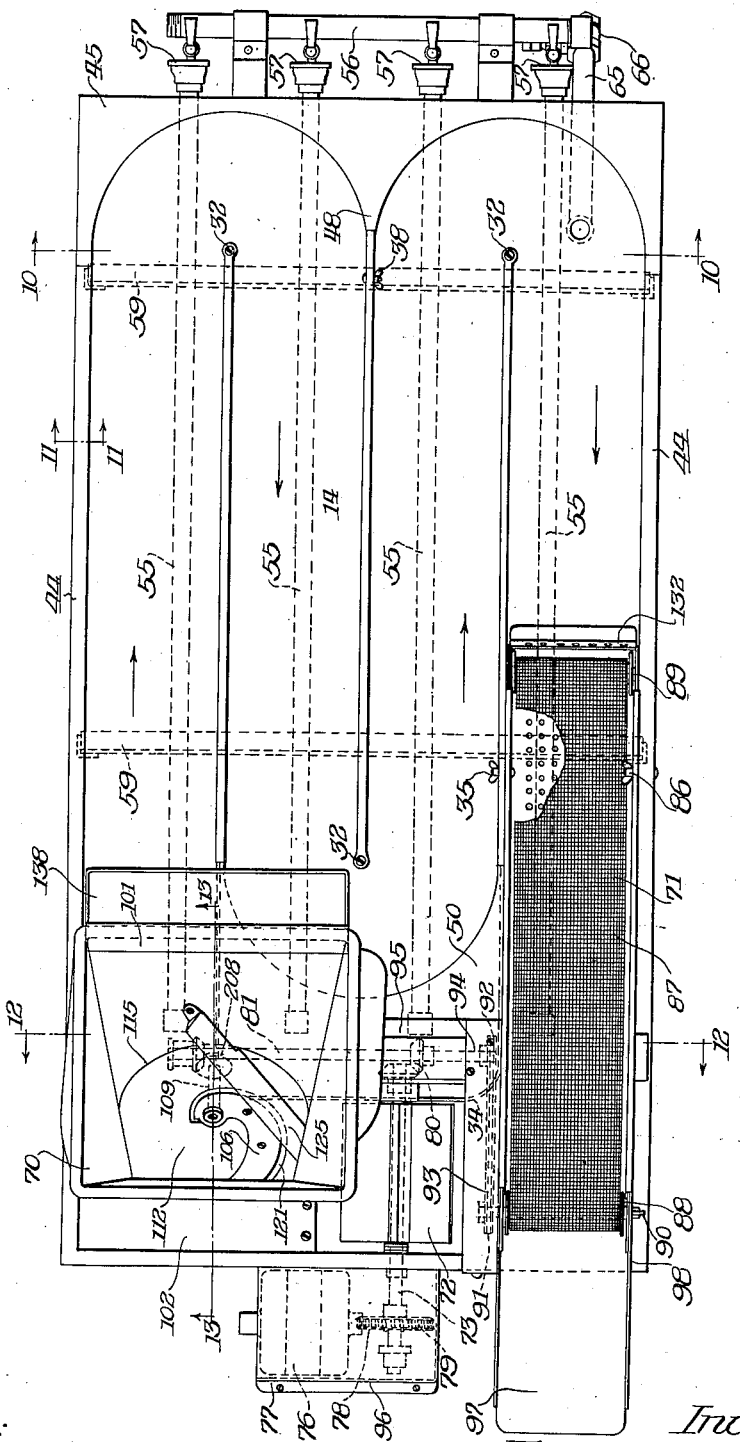

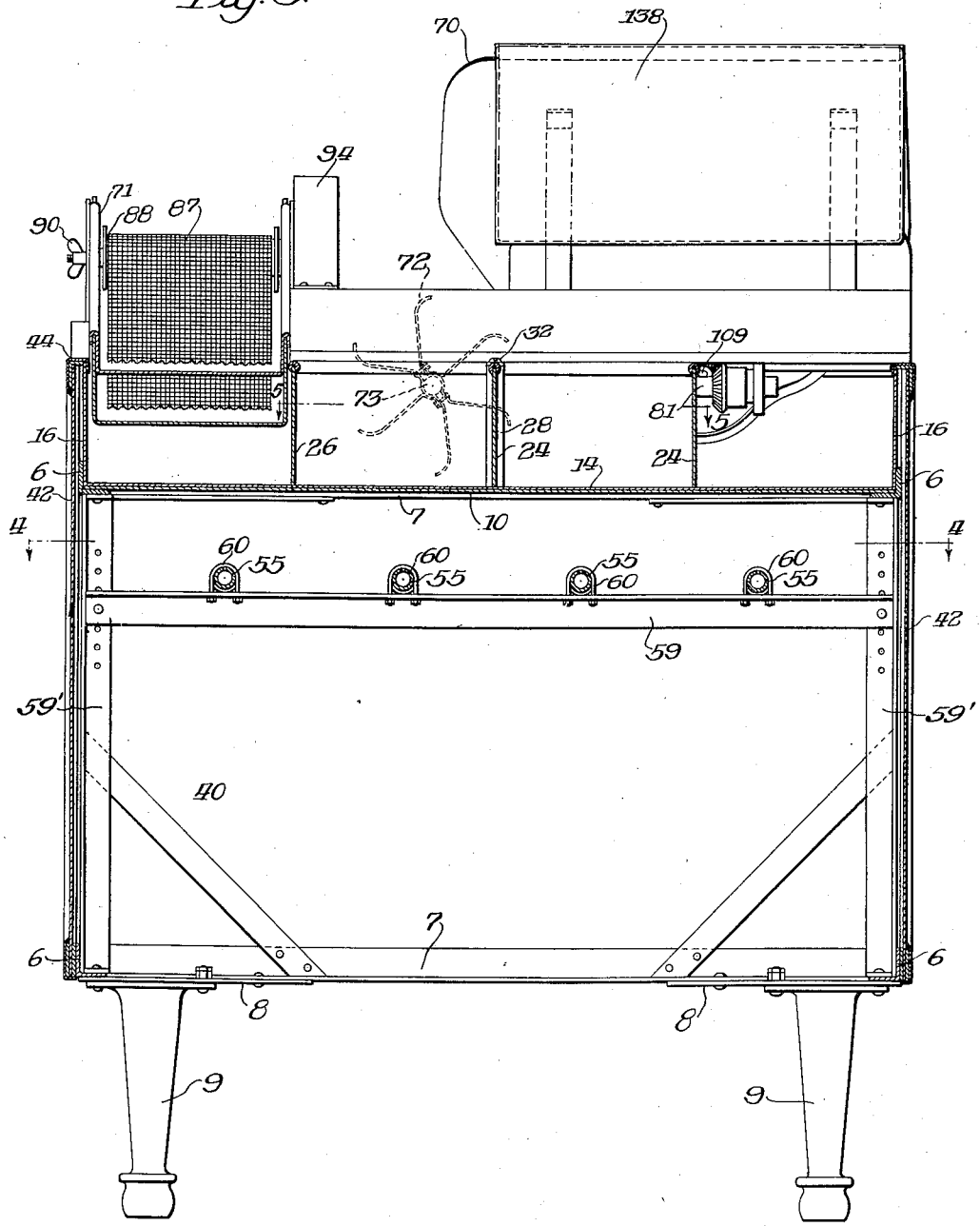

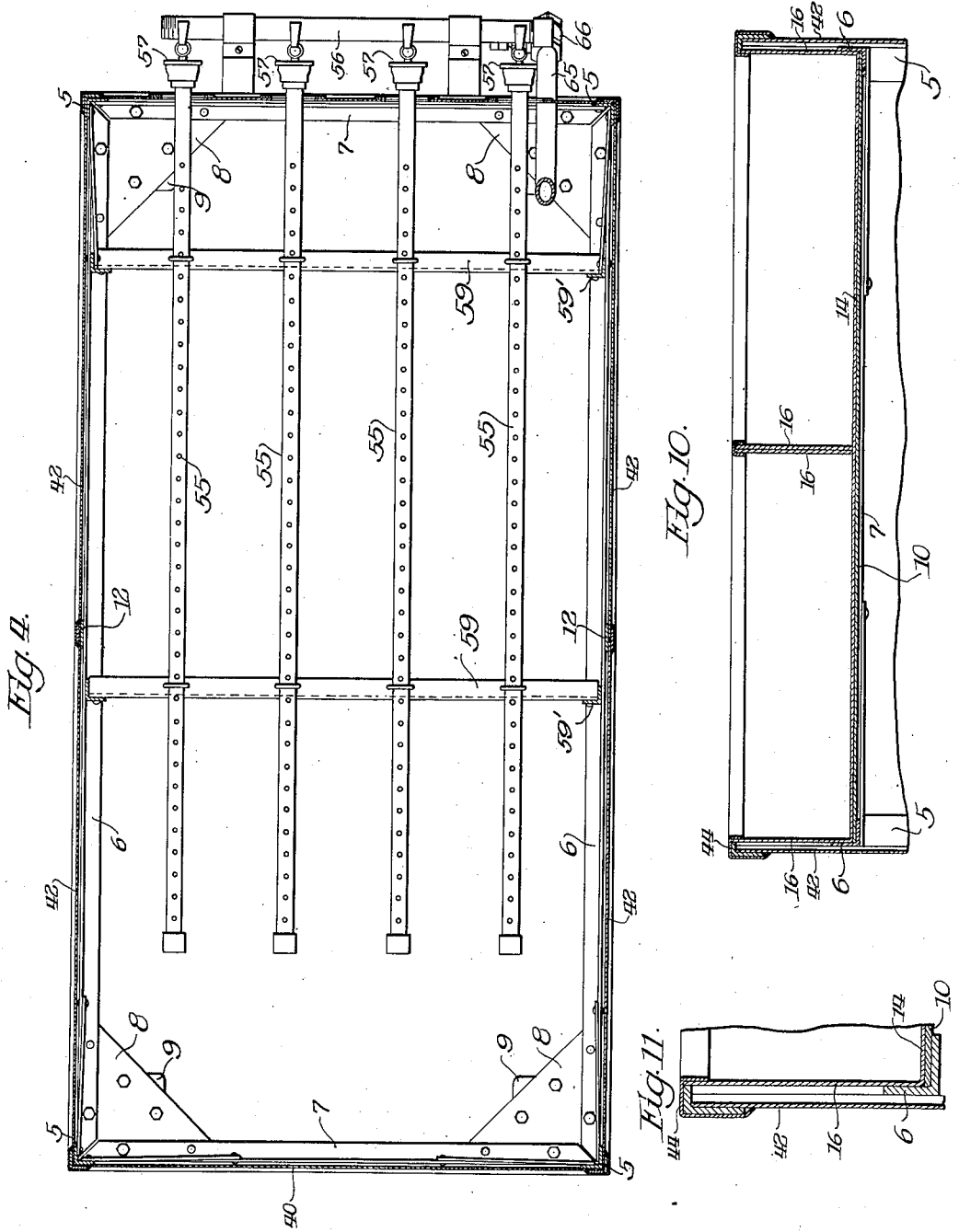

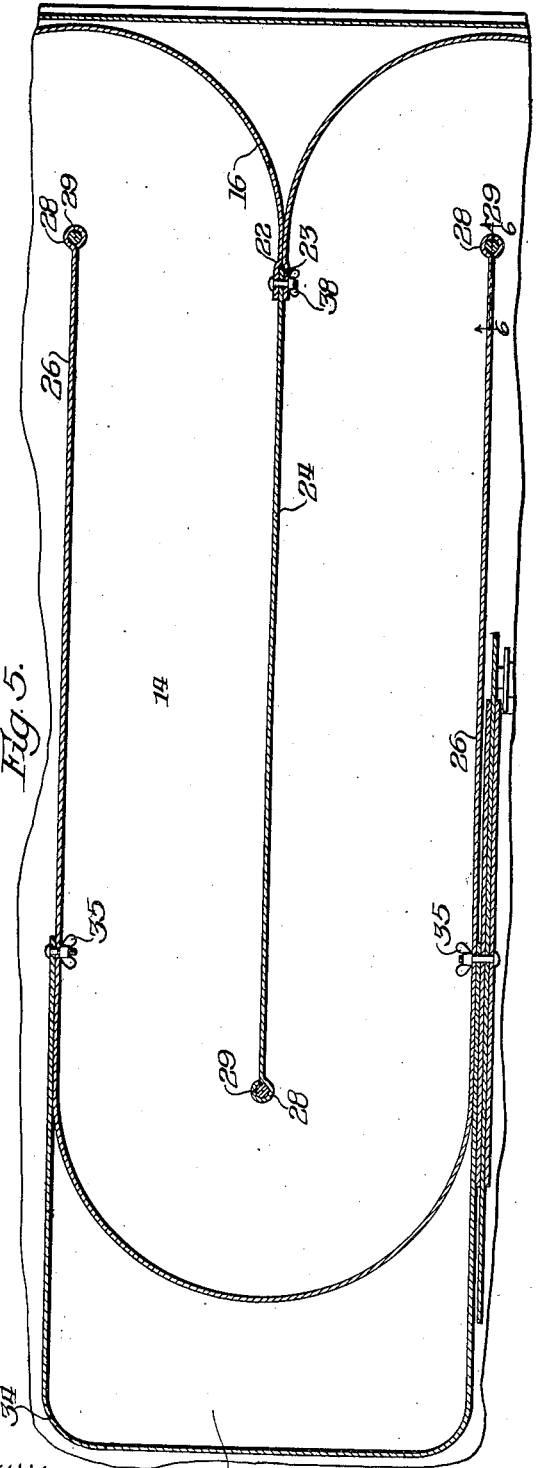

May 17, 1927.
F. L. MORROW
1,629,355
AUTOMATIC POTATO CHIP MACHINE
Filed April 11, 1925      7 Sheets-Sheet 6
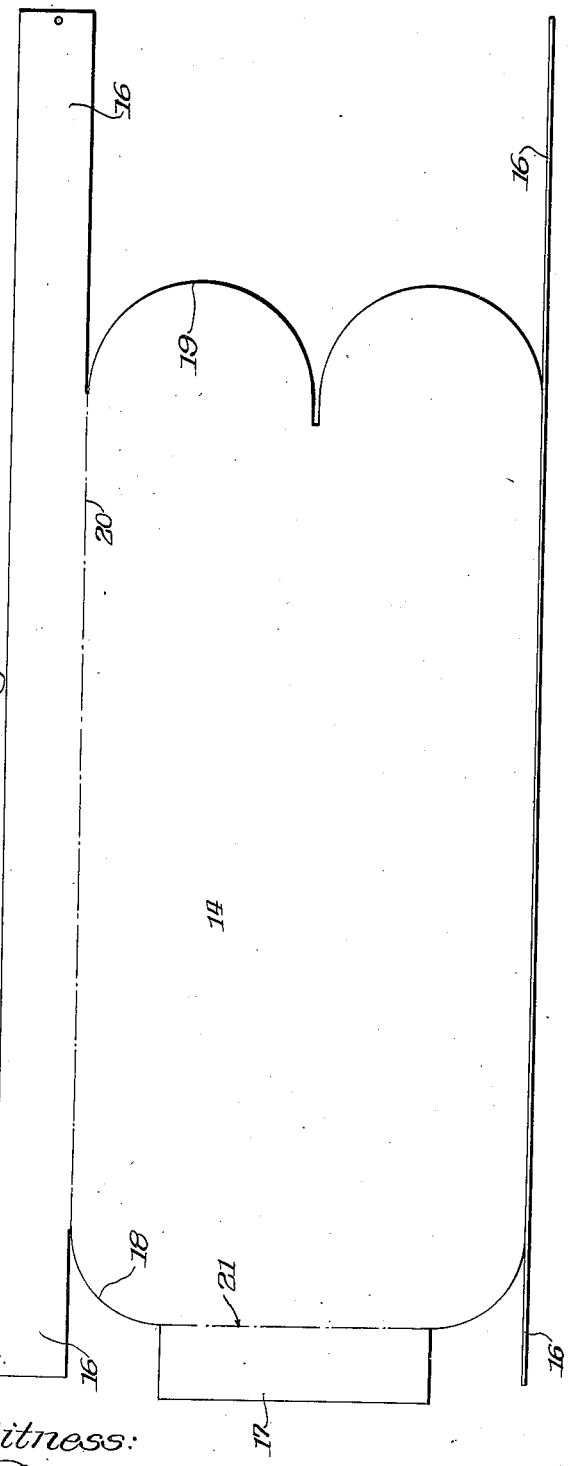
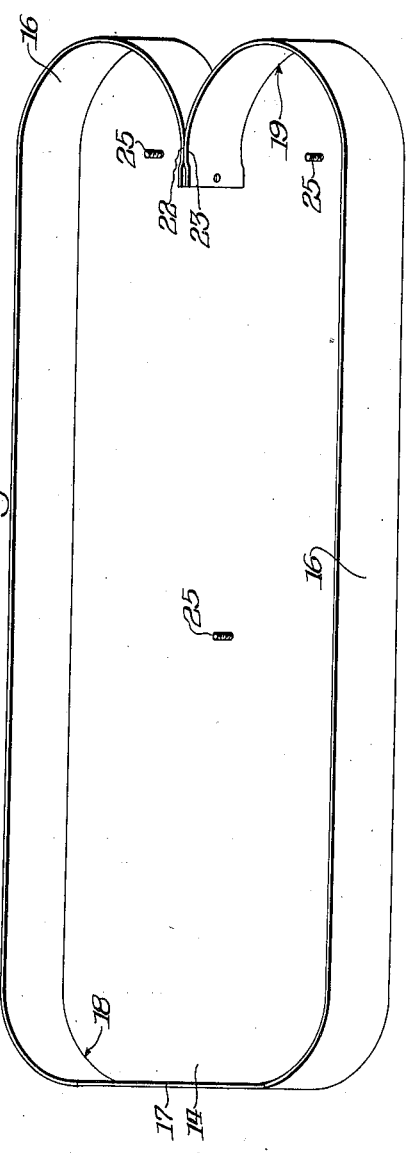

May 17, 1927.　　　　　F. L. MORROW　　　　　1,629,355
AUTOMATIC POTATO CHIP MACHINE
Filed April 11, 1925　　　7 Sheets-Sheet 7

Inventor.
Forrest L. Morrow.
By Brown, Bretteln & Wiener
Attys

Patented May 17, 1927.

1,629,355

UNITED STATES PATENT OFFICE.

FORREST L. MORROW, OF CHICAGO, ILLINOIS.

AUTOMATIC POTATO-CHIP MACHINE.

Application filed April 11, 1925. Serial No. 22,259.

This invention relates to automatic potato chip machines and its object is the provision of a generally improved, simplified, and sanitary construction that may be economically produced and easily cleaned and which will operate quietly and expeditiously to fry the chips uniformly and to deliver them unbroken and in a sanitary condition.

The invention is illustrated in the accompanying drawings, in which:

Figure 1 is a side elevation of the entire machine;

Fig. 2 is a plan view of the same;

Fig. 3 is a vertical section on the line 3—3 of Fig. 1;

Fig. 4 is a horizontal section on line 4—4 of Fig. 3;

Fig. 5 is a detail horizontal section through the partitions which divide the pan into the connected run ways which form the endless channel;

Fig. 6 is a detail section on line 6—6 of Fig. 5;

Fig. 7 is a detail section on line 7—7 of Fig. 6;

Fig. 8 shows the blank from which the grease pan is formed;

Fig. 9 is an isometric view of the grease pan.

Figure 13:
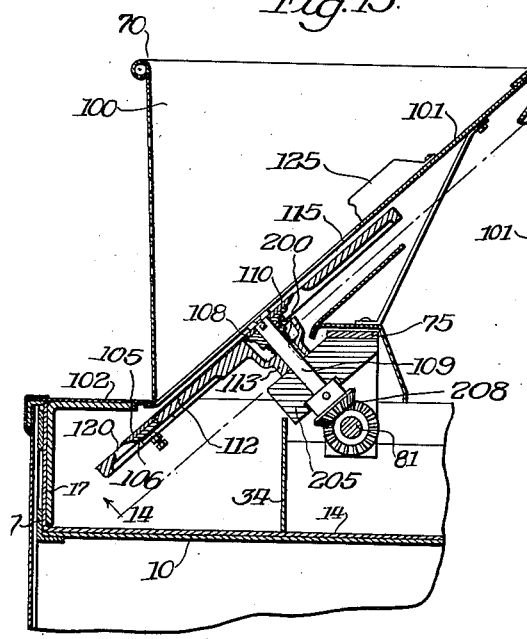
Figure 14:
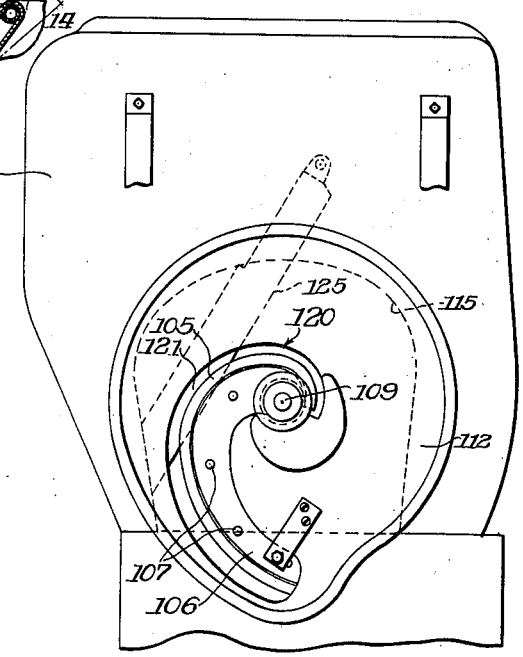
Figure 15:
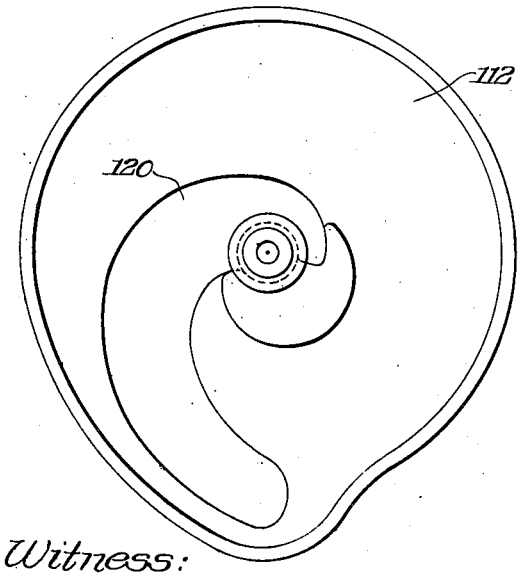
Figures 16, 17:
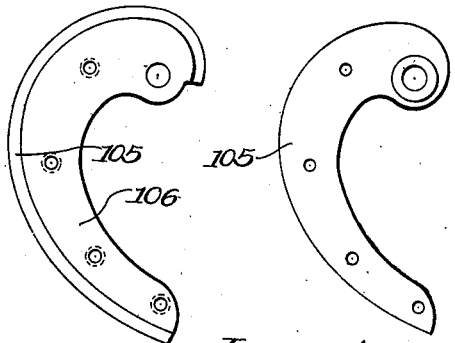

Figs. 10 and 11 are detail sections on lines 10, 10 and 11, 11, respectively of Fig. 2;

Fig. 12 is a vertical section on line 12, 12 of Fig. 2;

Fig. 13 is a vertical section through the hopper and potato chip cutter on line 13—13 of Fig. 2;

Fig. 14 is a rear elevation of the hopper and cutter;

Fig. 15 is a plan view of the knife base or plate member;

Fig. 16 is a plan view of the knife and holder; and

Fig. 17 is a plan view of the knife.

The frame of the machine comprises angular corner posts 5 secured together by angular side members 6 and angular end members 7. The sides and ends of the frame may be braced by suitable diagonal corner braces, as desired. Secured to the bottom of the frame at the four corners thereof are gusset plates 8 and bolted or otherwise secured to these gusset plates and to the frame, one at each of the four corners thereof, are the legs 9.

The upper side and end members 6 and 7 have their base flanges in a common horizontal plane and these base flanges form a surrounding ledge upon which is supported a plate 10, the upstanding flanges of the side and end members 6 and 7 surrounding this plate and being suitably secured to the angular flanges of the corner posts. Intermediate its ends the sides of the frame are provided with vertical bars 12 secured to the side members 6. The upper side and end members 6, 7 are set below the upper ends of the corner posts 5 and side bars 12, so that the grease pan 14 will set down in the upper end of the frame when in place upon the plate 10.

The blank from which the pan 14 is formed is shown in Fig. 8. It comprises a sheet of suitable sheet metal having longitudinal side extensions 16 at opposite ends and an end extension 17 at one end between the adjacent side extensions 16. At the end adjacent the extension 17 the blank is curved at 18 to give the desired base configuration and at the opposite end the blank is formed with a double curve 19 for the same purpose. The sides 16 and end 17 are turned up into a vertical plane on the dot-and-dash lines 20 and 21 and form the sides and one end of the pan, these portions of the blank being of a width to give the desired height to the pan when completed. The sides 16 adjacent the end 17 are then turned in along the edges 18 to meet or overlap the opposite ends of the end 17 and are welded, or otherwise united along their lower edges to the edges 18 and along their ends to the opposite edges of the end wall 17. The opposite ends of the sides 16 are similarly turned in along the double curved edge 19 and are welded or joined thereto and to each other at 22. Inwardly beyond where they are united at 22, the adjacent ends of the sides 16 are spaced at 23 to receive one end of the central or intermediate partition 24. Projecting through the bottom of the pan with their heads soldered or otherwise secured to the under side thereof are three upright threaded studs 25. The pan 14 rests upon and is supported by the plate 10.

The interior of the pan 14 is divided into a tortuous channel by an outer partition 26 and the central partition 24. One end of the intermediate partition 24 and the opposite ends of the outer U-shaped partition 26 are rolled at 28 and these rolled ends 28 slip removably over posts 29 which are screwed down firmly upon the threaded studs 25. The unrolled end of the partition 24 fits between the free edges 23 of the end wall of the pan, and an inverted channel edge strip 30, fitting over the upper edge of the partition 24 and soldered or otherwise suitably secured thereto, projects beyond the partition at one end to fit over the free edges of the end walls 16 when the partition 24 is in place. A screw 32 inserted through the opposite end of the edge strip 30 and threaded into the post 29 secures the intermediate partition in place with its lower edge firmly upon the bottom of the pan 14.

The outer U-shaped partition 26 is similarly secured in place at its opposite rolled ends and with its lower edge firmly upon the bottom of the pan 14. A supplemental U-shaped partition 34 having its free ends secured in place with the partition 26, as by means of the wing bolts 35, forms a compartment 36 for the driving mechanism and has its base spaced from the motor end of the pan 14 to form a connecting channel between the outer run ways at the motor end of the machine, the opposite ends of these outer run ways being connected at their opposite ends with the inner run ways. The unrolled end of the partition 24 may be secured between the ends 23 by a wing nut 38.

By removing the screws 32 and the wing nuts 35 and 38 all of the dividing partitions may be removed from the pan. Upon their removal the pan is left wholly undivided. This permits effective cleaning, and fixed corners between the lower edges of the dividing partitions and the bottom of the pan into which dirt and undesirable accumulations will settle are eliminated.

The ends of the frame are closed by end panels or walls 40 and each of the opposite sides of the frame is closed by a pair of side panels 42. These panels may be of sheet metal suitably finished and they may be lined internally with asbestos to minimize heat loss from the open bottom compartment formed beneath the pan 14 thereby. Finishing strips cover the margins of the panels and are secured with the panels to the frame work of the machine. The adjacent edges of the two panels on each side are covered by a strip 43 secured with the adjacent edges of the panels to the vertical bars 12 of the frame. The finishing strips 44 along the upper edge may be of inverted channel formation to fit over the upper edges of the panels and the upper edge of the pan 14. At the end opposite the motor end of the machine the strips 44 terminate short of the end of the machine and are supplemented by a cover 45, the outer flanges of which embrace the adjacent sides and end of the machine, while the inner flange supplements the strips 44 and conforms to the double curved end of the pan to fit over and finish the upper edge thereof. The meeting ends of the cover 45 and strips 44 may be welded or otherwise joined and the median projection 48 of the cover is of inverted channel formation and fits over the channel strip 30 and the end of the partition 24 which engages therebetween. At the opposite end of the machine the open top of the driving compartment 36 is closed by a cover 50.

The pan 14 is filled to the desired level with fat or other suitable cooking grease and this is heated by the flames from burners 55 disposed in the open bottom compartment beneath the pan 14. The burners comprise four longitudinal burner pipes to which gas or other suitable fuel is supplied from a header 56 mounted transversely across the end of the machine opposite the motor end and connected to the respective burner pipes 55 by control valves 57. The burner pipes 55 lay upon and are supported by transverse angular frame members 59 secured at their opposite ends to upright members or braces 59' of the frame. The upright members 59' each preferably has a series of vertically spaced apertures and the opposite ends of the members 59 are apertured for register with these apertures, bolts being inserted to attach the two together. The series of spaced apertures in the upright members permit the members 59 to be adjusted vertically to position the burner pipes 55 up closer or down farther away from the pan 14. The pipes 55 may be secured firmly to the cross members 59 by U bolts 60, the pipes 55 having longitudinally spaced apertures in their upper walls forming outlet orifices.

A drain pipe 65, which may be controlled by a valve 66, is adapted to drain the fat or grease from the pan 14.

A potato slicing device or cutter 70 is operatively mounted to slice potatoes and feed chips separately into the channel and means in the form of a conveyor 71 is mounted and operative to remove the chips from the channel. An impeller 72 is disposed in the channel in that portion thereof in which the flow of the liquid is from the removing means to the slicing device and is mounted and operative to circulate the liquid in the channel.

The impeller 72 comprises revolvable blades which may be formed of sheet metal and sectionalized, as shown in dotted lines in Fig. 3. These blades are fixed upon the shaft 73 for rotation therewith. The shaft 73 extends through and is journaled in the adjacent end wall of the machine. The opening through which it extends may be suitably bushed and provided with gland means. The opposite end of the shaft 73 is journaled in a bracket carried by the generally U-shaped inverted frame member 75, the depending legs of which are suitably attached to the frame of the machine.

A motor 76 is mounted upon a bracket 77 attached to the end of the machine and the motor shaft has a worm 78 which meshes with a worm wheel 79 fixed upon the impeller shaft 73. The opposite end of the shaft 73 is geared at 80 to a transverse shaft 81 journalled on the frame member 75.

The removing means 71 comprises a trough-like frame, the lower extending base of which rests on the bottom of the pan 14. The frame 85 is secured firmly in place by the wing nut 35 and by an additional wing nut 86, removal of the wing nuts 35 and 86 and their engaging bolts permitting removal of the removing means as a unit from the machine. The endless conveyor 87, which may be in the form of a chain belt, is trained at its upper end about a corrugated driving roller 88 and at its lower end about a roller 89 which may likewise be corrugated. The roller 88 is fixed upon a shaft 90 which shaft has fixed thereon a relatively large sprocket wheel 91. The shaft 81 has, on its conveyor end, a relatively small sprocket 92 and a chain 93 trained over the sprockets 91 and 92 drivingly connects the conveyor shaft 90 with the shaft 81. The chain connection to the conveyor may be enclosed in a guard or cover 94, while the drive shaft 81 and associated gearing may be enclosed in a cover 95. In Fig. 1 I have shown the motor and worm drive therefrom enclosed in a cover or housing 96.

The discharge end of the removing means comprises a trough-like member 97, the base of which projects from one end, while the sides project from the other end and are pivoted upon the shaft 90. This pivotal mounting of the discharge chute permits angular adjustment to deliver to any desired point.

The cutting means 70 comprises a hopper 100 beaded about its upper edge and having a wall 101 lying in an oblique plane over the surface of the fat or body of fat in the pan 14. The space about the bottom of the hopper and between it and the end wall is covered by a horizontal portion 102.

The means for cutting the potatoes into chips comprises a cutting knife 105 secured to a knife holder 106 by means of screws 107. The holder 106 has a hub or sleeve 108 which is adapted to be slipped onto the shaft 109 and to be locked or secured in position and for rotation with the shaft 109 by means of a set screw 110. A knife plate or base 112 is also provided with a hub or sleeve 113 which is adapted to be slipped onto the shaft 109 and locked or secured in place, and for rotation with the shaft and cutter, the knife 105 overlying the base 112. The weight of the potatoes in the hopper 100 causes those over the opening 115 through the oblique wall 101 to bear against the plate or base member 112 and the knife, in its rotation, engages the portions of the potatoes projecting through the opening 115 at the desired adjusted position above the plate 112 and cuts the potatoes into chips of any desired thickness.

The knife 105 operates above the plate 112, the thickness of the chips to be cut, and this thickness may be adjusted by adjusting the knife and holder and the plate 112 with respect to each other, as by releasing the set screw 110 and moving the knife toward or away from the plate 112 and again drawing up the set screw to bind the knife in place. The cutter may be thereby caused to cut the potatoes into chips of the desired thickness. The plate 112 has an opening 120 therethrough which is of the same shape as the knife 105, but larger, so as to provide a space 121 between the inner edge of the opening 120 and the cutting edge of the knife (Fig. 14). The plate 112 turns or rotates with the cutter and the opening 120, being shaped like the cutter, disposes this opening below the cutting edge at all times and regardless of the order or manner in which the potatoes drop through the outlet 115, the plate or base 112 being, at the same time, always disposed to receive the potatoes from the outlet 115.

The cutting edge of the knife 105 is in the form of a scroll, i. e., the edge starts at a point adjacent to the shaft 109 and terminates at a point adjacent the outer edge of the plate 112 and is arched or scrolled thereto. The cutter operates in an oblique plane over the surface of the body of liquid or fat in the shell.

To hold the potatoes being cut against movement and slipping away from the knife 105 in the cutting operation, I attach bar 125 to the upper side of the oblique bottom 101 of the hopper 100 and across the outlet opening 115. This bar forms a stop or abutment for the bottom or lowermost potatoes and holds them against movement and slipping away in the cutting operation. It may be conveniently formed of sheet metal, folded to give the desired height and bolted or otherwise attached to the bottom wall 101.

In operating the machine the burners 55 are lighted and they heat the fat in the runway 14. Raw peeled potatoes are placed in the hopper 100 and are cut by the knife 105 into chips and fed to the surface of the fat in effective position for floating separately thereon. The thickness of the chip may be regulated by adjusting the space between the knife 105 and the plate 112. The paddle 72 circulates the liquid in the direction indicated by the arrows in Fig. 2, and the chips are carried therewith to the removing means 71, the runway being of sufficient length to thoroughly cook the chips by the time they reach the remover 71. The lower end of the belt 87 is immersed in the fat and removes the chips from the fat as they reach the belt. The fat continues to flow past the lower end of the belt 87 back to the paddle 72 from where it is impelled in a forward direction by the paddle.

Any fat that may be on the chips as they are removed by the belt 87 drips or passes back into the pan 14. The adjustable chute 97 delivers the chips from the remover to any desired point. The side panels 42 of the machines are provided with openings 130. A strainer 132 is provided adjacent the lower end of the belt 87 to prevent passage of chips in any way back to the paddle and strain the liquid in its passage back thereto. A catch-all pan 138 may be hooked upon the hopper 100, as shown, and any matter which it is desired to discard may be removed from the machine and discharged into this pan.

The upper end of the hub 113 of the base or plate 112 is recessed and a spring 200 is confined in this recess and urges the bottom of the hub 113 away from the hub 108 and against the journal 205. The oblique cutter shaft 109 is journaled in the block 205 and said block may be carried by the frame piece 75. The lower end of the shaft 109 is geared at 208 to the cross shaft 81.

I claim:

1. In combination, a pan, removable partitions dividing said pan into an endless channel for containing a liquid, a partition mounted with said first partitions and defining a driving compartment, a potato slicing device operative and mounted to slice potatoes and feed chips separately into said channel, means for removing said chips from said channel, revolvable blades for circulating said liquid in said channel, said channel being otherwise unobstructed and said revolvable blades being disposed in said channel in that portion thereof in which the flow of said liquid is from said removing means to said slicing device, a shaft for the blades, a shaft extending transversely across the machine through the driving compartment and geared to said blade shaft, a slicer shaft geared to said last shaft adjacent the driving compartment, a sprocket on said cross shaft adjacent the moving means, a chain drivingly connecting said sprocket with said removing means, and a motor mounted upon one end of the machine and geared directly to the blade shaft.

2. In a machine of the class described, the combination of a reservoir having a bottom and side walls, a plurality of posts mounted upon the bottom of the reservoir, a U-shaped partition disposed in the reservoir with its free ends mounted upon said posts and an intermediate partition lying between the legs of said first partition and removably mounted upon another of said posts.

3. In a machine of the class described, the combination of a reservoir having a bottom and side walls, a plurality of posts mounted upon the bottom of the reservoir, a U-shaped partition disposed in the reservoir with its free ends mounted upon said posts and an intermediate partition lying between the legs of said first partition and removably mounted upon another of said posts, the reservoir having a double curved end and the opposite end of said intermediate partition being removably attached to said end between the side walls of the reservoir.

4. In a machine of the class described, the combination of a reservoir having a bottom and side walls, a plurality of posts mounted upon the bottom of the reservoir, a U-shaped partition disposed in the reservoir with its free ends mounted upon said posts, an intermediate partition lying between the legs of said first partition and removably mounted upon another of said posts, the reservoir having a double curved end and the opposite end of said intermediate partition being removably attached to said end between the side walls of the reservoir, and a second U-shaped partition straddling the base of said first U-shaped partition and mounted therewith, said last partition forming a driving compartment outside the runway formed by said partitions.

5. In a machine of the class described, the combination of a reservoir having a bottom wall, a threaded stud secured to said bottom wall and projecting upwardly therefrom, a post removably mounted upon said stud, a partition removably mounted upon said post and means for securing the partition upon the post.

6. In a machine of the class described, a generally rectangular frame comprising corner posts, upper and lower side and end rails connecting same, a liquid pan supported by the upper rails, removable partition means dividing the interior of said pan into a tortuous channel, vertical side bars attached to said side rails, a cross bar underlying the liquid pan and adjustably attached to said side bars, a plurality of longitudinal burner pipes overlying and supported upon said cross bars, and clip means fastening said pipes to said bars.

In witness whereof I hereunto subscribe my name this 7th day of April, 1925.

FORREST L. MORROW.